United States Patent [19]
Boswell

[11] 4,294,287
[45] Oct. 13, 1981

[54] SHIFTING VALVE

[76] Inventor: William C. Boswell, 420 E. 2nd, Tulsa, Okla. 74120

[21] Appl. No.: 111,902

[22] Filed: Jan. 14, 1980

Related U.S. Application Data

[63] Continuation of Ser. No. 945,398, Sep. 25, 1978, abandoned.

[51] Int. Cl.³ .............................................. F15B 13/06
[52] U.S. Cl. .................................. 137/625.69; 91/536; 192/87.13
[58] Field of Search ...................... 91/536; 137/625.69; 192/87.13, 87.18, 87.19

[56] References Cited

U.S. PATENT DOCUMENTS

| | | | |
|---|---|---|---|
| 2,949,097 | 8/1960 | Vander Kaay | 91/464 X |
| 2,984,258 | 5/1961 | Clary | 137/596.2 X |
| 3,024,808 | 3/1962 | Woodruff | 137/625.69 |
| 3,292,659 | 12/1966 | Raeber | 137/625.69 X |
| 3,468,194 | 9/1969 | Horsch et al. | 192/87.13 X |
| 3,586,054 | 6/1971 | Michael | 137/625.68 |
| 3,618,727 | 11/1971 | Cornet | 192/87.13 |
| 3,841,608 | 10/1974 | Schmitt et al. | 137/625.69 X |

*Primary Examiner*—Gerald A. Michalsky
*Attorney, Agent, or Firm*—Head & Johnson

[57] ABSTRACT

A shifting valve for actuation of a multiple position transmission and comprising a shifting element having a plurality of positions for controlling the flow of power fluid to supply power fluid independently for each position of the transmission.

7 Claims, 6 Drawing Figures

SHIFTING VALVE

This is a continuation of application Ser. No. 945,398, filed Sept. 25, 1978, now abandoned.

BACKGROUND OF THE INVENTION

1. Field of the Invention

This invention relates to improvements in valves and more particularly, but not by way of limitation, to a shifting valve for supplying fluid to a multiple position transmission for actuation thereof.

2. Description of the Prior Art

Most vehicle engines in use today include a transmission having at least three positions to provide two forward speeds and one reverse speed for the engine. In addition, many engines have transmissions including a fourth position in order to provide three forward speeds and one reverse speed for the engine. Current trends in engine design suggest a real need for efficient and economical transmissions having as many as six positions and it will be readily apparent that each additional position for a transmission increases the difficulty of providing power fluid to each of the positions.

SUMMARY OF THE PRESENT INVENTION

The present invention contemplates a novel shifting valve particularly designed and constructed for facilitating the operation of a multiple position transmission, and comprises a plurality of fluid passageways in communication with a fluid source and outlet ports in communication independently with each position of the transmission for directing fluid to the transmission for operation thereof. A shifting member is interposed between the fluid source and the outlet ports and is provided with a plurality of lands on the outer periphery thereof for selectively shunting the fluid from the fluid source to the outlet ports as required for the selective actuation of the multiple positions of the transmission. The novel valve is simple and efficient in operation and economical and durable in construction.

DESCRIPTION OF THE PREFERRED EMBODIMENT

Figure 1:
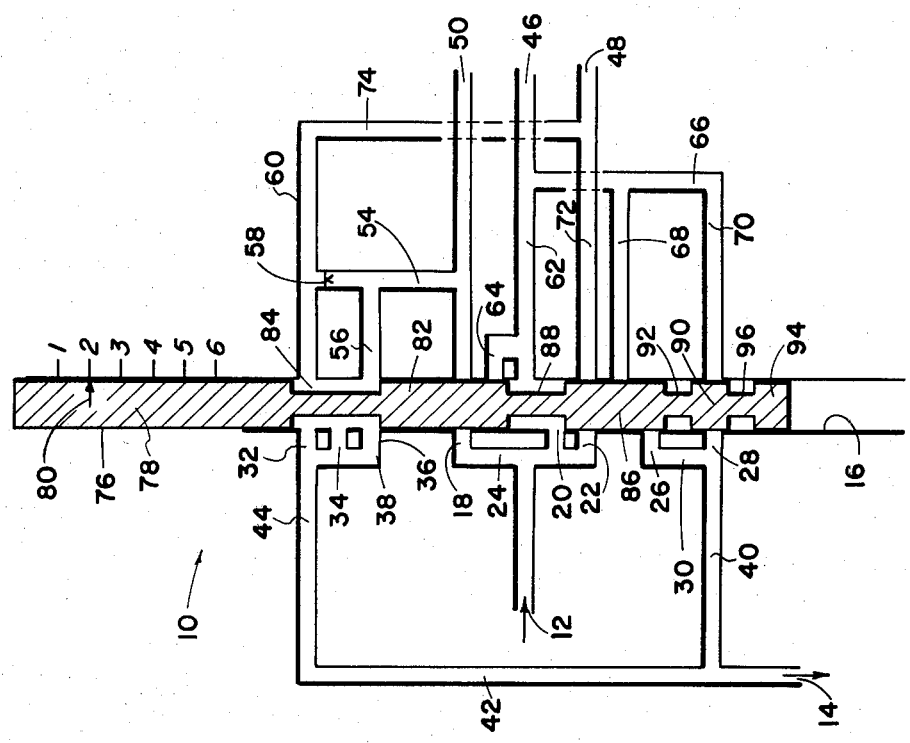
FIG. 1 is a schematic view of a shifting valve embodying the invention and illustrating one position for the shifting member thereof.

Referring to the drawings in detail, reference character 10 generally indicates a shifting valve schematically illustrated in FIGS. 1 through 6 and comprising a suitable valve body (not shown) having a fluid inlet 12 in communication with a source of pressure fluid (not shown) and a discharge port 14 also in communication with the source of pressure fluid in order that the fluid may be circulated through the valve body during operation of the valve 10 as will be hereinafter set forth. The inlet port 12 is in communication with a central bore 16 through a passageway array comprising three independent passageways 18, 20 and 22 connected by a common passageway 24. The passageways 18, 20 and 22 are open to the passageway 16 in spaced relation along the length thereof as clearly shown in the drawings for directing the fluid into the passageway 16 at preselected positions therein. The outlet or discharge port 14 is in communication with the passageway 16 through a passageway array comprising a first set of spaced passageways 26 and 28 interconnected by a common passageway 30 and a second set of spaced passageways 32, 34 and 36 interconnected by a common passageway 38. The passageway 30 is in communication with the discharge port 14 through a passageway 40 and 42, and the passageway 38 is in communication with the discharge port 14 through a passageway 44 and the passageway 42.

Assuming that the valve 10 is to be utilized in combination with a transmission (not shown) having six positions, with three clutches (not shown) being provided for achieving said six positions, the valve body (not shown) is provided with a first actuator outlet 46 in operable communication with one of the clutch members (not shown), a second actuator outlet 48 in operable communication with the second clutch member (not shown), and a third actuator outlet 50 in operable communication with the third clutch member (not shown). The outlet 50 is in direct communication with the passageway 16 through a passageway 52 and through a branch passageway 54 which extends into communication with a passageway 56. The passageway 54 is also in communication with the passageway 16 through a check valve 58 interposed between the passageway 54 and a passageway 60. The outlet 46 is in direct communication with the passageway 16 through a passageway 62 and an offset branch passageway 64. The passageway 62 is also in communication with the passageway 16 through a branch passageway 66 having a pair of spaced passageways 68 and 70 extending into communication with the passageway 16. The outlet 48 is in direct communication with the passageway 16 through a passageway 72 and also in communication with the passageway 60 through a branch passageway 74. It will thus be readily apparent that the outlets 46, 48 and 50 are all in communication with the passageway 16 through a plurality of passageways open to the passageway 16 in spaced relationship along the length thereof.

A slide member of shifting element 76 is slidably disposed within the passageway 16 and may be reciprocated therein in any suitable manner (not shown) as is well known for selective distribution of the pressure fluid to the outlets 46, 48 and 50. The shifting element 76 is provided with a first land member 78 on the outer end thereof suitably inscribed with an index or arrow 80 for selective register with preselected positions in the bore or passageway 16 as indicated by the numerals 1 through 6 in the drawings, and as will be hereinafter set forth. A second land 82 is provided on the slide member 76 spaced from the land 78 by an annular groove or recess 84. A third land 86 is spaced from the land 82 by a groove or annular recess 88. A fourth land 90 is spaced from the land 86 by an annular groove 92, and a fifth land 94 is spaced from the land 90 by an annular recess or groove 96.

In a first position for the slide member 76 wherein the index 80 is in substantial alignment with the first indicated position as shown in FIG. 1, the recess 84 is disposed in communication with the passageways 44 and 60, and the passageways 36, 56, 18 and 52 are closed or blocked off by the land 82. The recess 88 is open to the passageways 62 and 64, and the passageways 20, 22, 72 and 68 are closed or blocked off by the land 86. The recess 92 is open to the passageway 26 and the recess 96 is in communication with the passageways 28 and 70. The lands 78 and 94 close the opposite ends of the passageway 16 from all the other passageways. In this position of the slide member 76, the incoming pressure fluid at the inlet 12 is blocked or sealed from the outlets 46, 48 and 50 and there will be no pressure fluid supplied to the transmission (not shown), and any pressure present at the port 46 is vented through 66, 70 and 40, and pressure at ports 48 and 50 is vented to the outlet 14 through lines 60, 44 and 42, thus providing a first drive position for the transmission.

Figure 2:
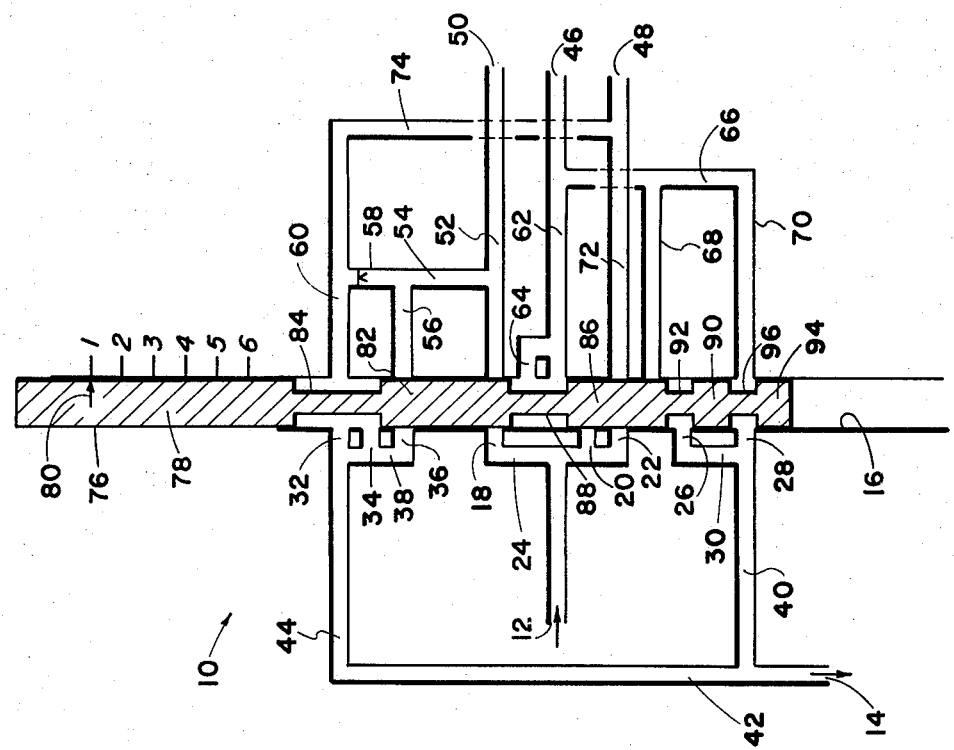
FIG. 2 is a view similar to FIG. 1 illustrating a second position for the shifting member.

When the slide element 76 is shifted to a second position, as shown in FIG. 2, the recess 88 is incommunication with the passageways 20 and 62 whereby the pressure fluid is directed from the inlet 12 to the outlet 46, and thus to the gear train (not shown) for applying pressure thereto in one direction to provide a second drive position for the transmission. At the same time, the inlet 12 is closed from the outlets 48 and 50 by the lands 86 and 82, respectively, thus precluding application of pressure fluid through the outlets 48 and 50. The outlets 48 and 50 are in communication with the pressure fluid outlet 14 through the passageways 60, 44 and 42 since the recess 84 is in communication with passageways 56, 60, 36, 34 and 44. The passageway 54 is in communication with the passageway 60 through the check valve 58 which permits the flow of fluid from the passageway 54 into the passageway 60, but precludes the back flow of pressure from the passageway 60 to the passageway 54. In this manner, the outlets 50 and 48 remain vented through the outlet 14 to the pressure fluid supply (not shown). The outlet 46 is closed from outlet 14 by the lands 86 and 90, thus assuring that the pressure fluid will be retained at the outlet 46 during activation of the transmission in this selected position.

Figure 3:
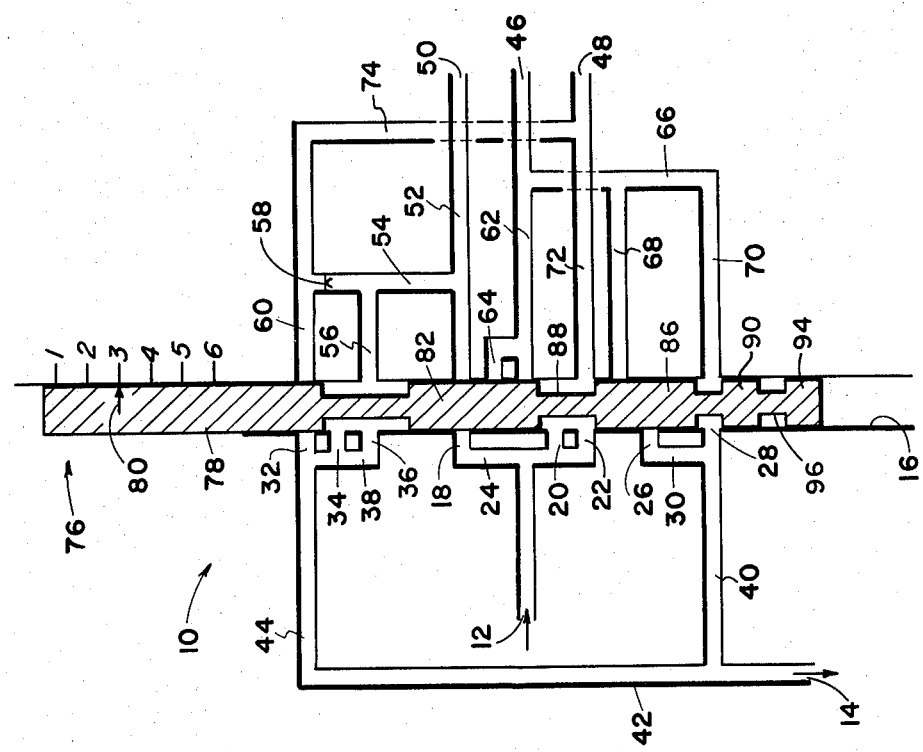
FIG. 3 is a view similar to FIGS. 1 and 2 illustrating a third position for the shifting member.

When the slide member 76 is moved to a third position as shown in FIG. 3, the land member 82 precludes communication between the pressure inlet 12 and the outlets 46 and 50. Recess 88, however, provides communication between the pressure inlet 12 and the outlet 48. In this position of the slide member 76, pressure fluid is directed to the gear train (not shown) of the outlet 48 for providing a third operating position for the transmission (not shown). At the same time, the port 50 is in communication with the pressure fluid return outlet 14 through the passageways 56, 34, 36, 44 and 42 for relieving any fluid pressure present at the port 50. In addition, the port 46 is in communication with the outlet 14 through the passageways 66, 70, 40 and 42. Communication between the port 48 and the outlet 14 is precluded by the lands 78 and 86, thus assuring that the pressure fluid will be maintained at the port 48 as long as the slide element 76 is in the position shown in FIG. 3.

Figure 4:
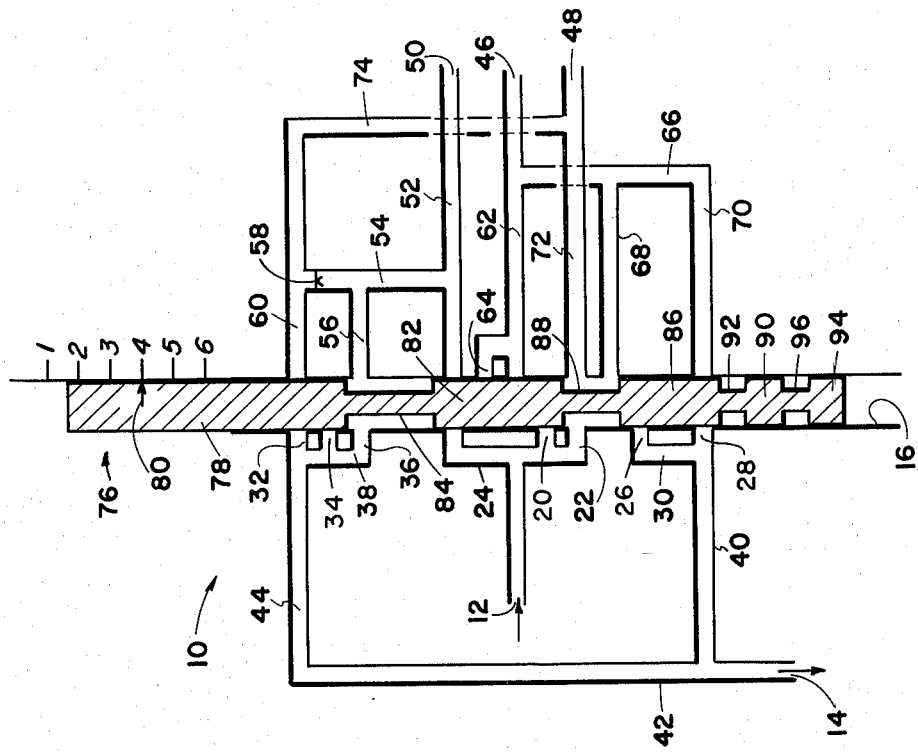
FIG. 4 is a view similar to FIGS. 1, 2 and 3 illustrating a fourth position for the shifting member.

When the slide member 76 is in the position shown in FIG. 4, still another driving position is provided for the transmission (not shown). In this position of the element 76, communication is established between the inlet 12 and the outlet 48 through the recess 88 and passageways 22 and 72, and simultaneously with the port 46 through the passageways 68, 66 and 62. In this manner, pressure fluid is simultaneously provided for the gear trains (not shown) of the clutches (not shown) associated with both the ports 46 and 48 to provide a fourth drive position for the transmission (not shown). Pressure is relieved from the port 50 through the passageways 52, 54, 56, 36, 38, 44 and 42 in the same manner as in the position shown in FIG. 3.

Figure 5:
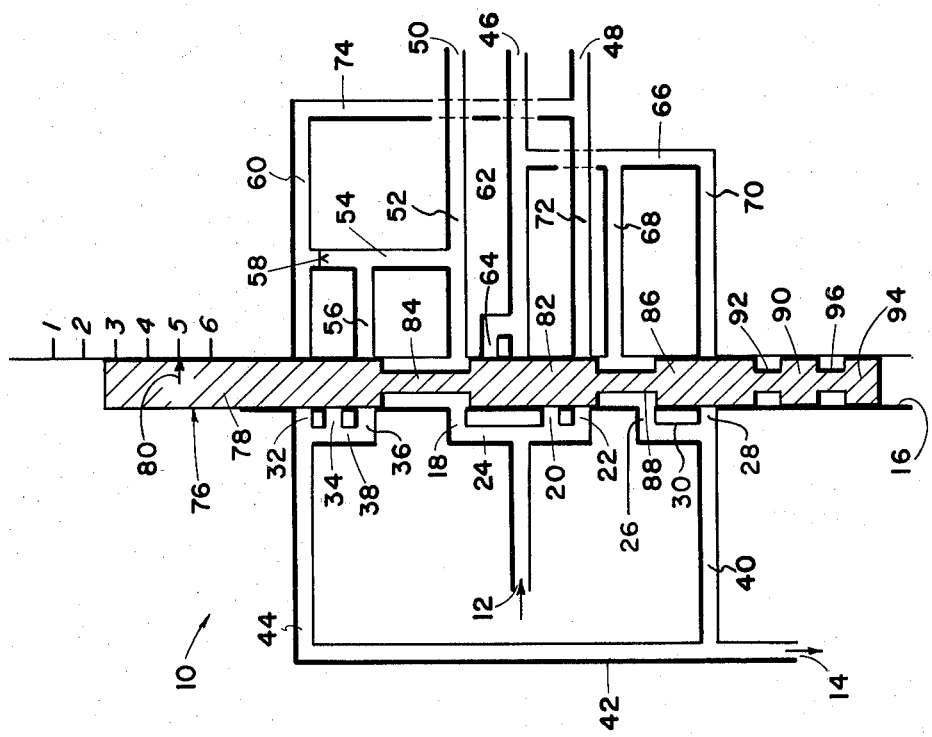
FIG. 5 is a view similar to FIGS. 1, 2, 3 and 4 illustrating a fifth position for the shifting member.

When the shifting element 76 is in the position shown in FIG. 5, the pressure fluid inlet 12 is in communication with the outlet 50 through the groove 84 which establishes communication between the passageways 18 and 52. Thus, fluid pressure is directed to the gear train (not shown) of the clutch (not shown) associated with the port 50 for providing another actuation position for the transmission (not shown). Communication between the port 50 and the return outlet 14 is precluded by the lands 78 and 82, thus assuring that the pressure fluid will be held at the port 50. At the same time, the port 48 is closed from communication with the outlet 14 by the lands 78 and 82, and the port 46 is vented through lines 66, 68, 26, 30, 40 and 42. Thus pressure fluid is maintained at each of the outlets 48 and 50 for providing still another stage of actuation or drive position for the transmission (not shown).

Figure 6:
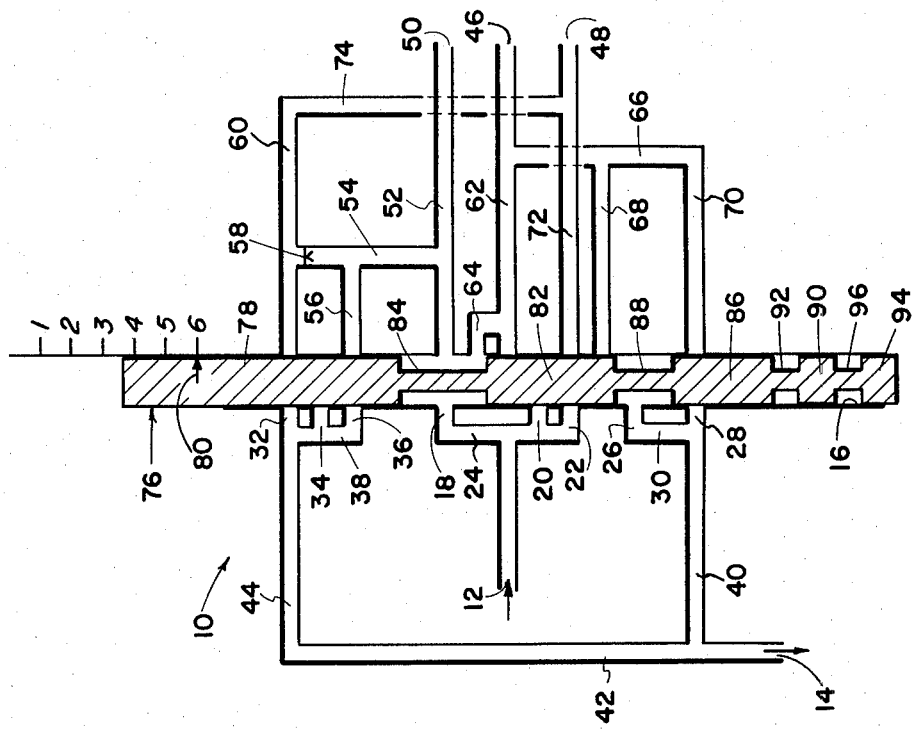
FIG. 6 is a view similar to FIGS. 1, 2, 3, 4 and 5 illustrating a sixth position for the shifting member.

As the shifting element 76 is moved to the position shown in FIG. 6, communication remains established between the pressure fluid inlet 12 and the outlet 48 through 58 and 60 around the recess 84, and communication is also established between the inlet 12 and outlet 46. Thus, still another actuation position is provided for the transmission (not shown).

From the foregoing it will be apparent that a plurality of driving or actuation positions for a transmission may be easily selected by the reciprocation of the shifting element 76. Of course, suitable means, such as mechanical stops and the like (not shown) may be provided for cooperation with the shifting element 76 in order to facilitate a positive determination of the plurality of positions therefor with respect to the ports and passageways provided in the shifting valve.

Whereas the present invention has been described in particular relation to the drawings attached hereto, it should be understood that other and further modifications, apart from those shown or suggested herein may be made within the spirit and scope of this invention.

What is claimed is:

1. A shifting valve comprising a valve body means having a central bore therein; a shifting element slidably disposed within said bore and movable between six definite preselected positions therein; first, second and third inlet passages provided in said valve body open to the bore and in communication with a source of pressure fluid; first and second multi-port outlet passageways provided in said valve body open to the bore and in communication with said source of pressure fluid whereby the fluid may be circulated through the valve; first, second and third actuator outlet passages provided in said valve body and open to the bore; a plurality of spaced lands and recesses provided on the outer periphery of said shifting element to cooperate with the inner periphery of the bore for shunting fluid flow between said inlet passages and said actuator outlet passages and the multi-port outlet passageways whereby said inlet passages are out of communication with said actuator outlet passages in a first position of the lands and recesses of the shifting element within the bore, said first inlet passage being in communication with said first actuator outlet passage in a second position of said lands and recesses of the shifting element within the bore; said first and second inlet passages being in communication with said second actuator outlet passage in a third position of said lands and recesses of the shifting element within the bore, said second inlet passage being in communication with said first and second actuator outlet passages in a fourth position of said lands and recesses of the shifting element within the bore; said third inlet passage being in communication with said second actuator outlet passage and in communication with said third actuator outlet passage in a fifth position of said lands and recesses of the shifting element within the bore, said third inlet passage being in communication with said first actuator outlet passage and with said second actuator outlet passage and with said third actuator outlet passage in a sixth position of said lands and recess of the shifting element, and said lands and recesses of said shifting element placing the multi-port outlet passageways in communication with each actuator outlet passage out of communication with the inlet passageways during operation of the valve.

2. A shifting valve for a multiple position transmission having multiple modes of operation and comprising valve body means having a pressure fluid inlet and a pressure fluid outlet provided therein, both said fluid inlet and fluid outlet being in communication with a pressure fluid source to provide for circulation of pressure fluid to and from the pressure fluid source through the valve, a bore provided in the valve body means and in communication with the fluid inlet and fluid outlet, a unitary shifting element slidably disposed within said bore and movable between definite preselected positions therein, a first multi-passageway array provided in said valve body means providing said communication between the fluid inlet and the bore for directing the pressure fluid into the bore, second and third multi-passageway arrays provided in said valve body means providing said communication between the bore and the fluid outlet for discharging pressure fluid from the bore, a plurality of independently isolated actuator outlets provided in the valve body means, each of said actuator outlets being in operable communication with the transmission for actuation thereof upon pressurization of the actuator outlets, a plurality of multi-passageway arrays provided in the valve body means interconnecting each actuator outlet with the bore whereby the pressure fluid may be selectively directed to and withdrawn from each actuator outlet upon the selective positioning of the shifting element within the bore, said shifting element being provided with a plurality of spaced lands and recesses on the outer periphery thereof cooperating with the bore and the multi-passageway arrays for opening and closing the arrays whereby pressure fluid is directed to the actuator outlets in a manner providing a single operational mode for the transmission at a time and for withdrawing the pressure fluid from the actuator outlets which are not pressurized, said shifting element being movable to said definite preselected positions therefor for connecting each actuator outlet with the fluid inlet for pressurization of each actuator outlet in two separate preselected positions of the shifting element, each different pressurization of each independent actuator outlet providing pressure fluid to the transmission to produce differing modes of operation therefor.

3. A shifting valve as set forth in claim 2 wherein the first multi-passageway array comprises three spaced ports open to the bore and in communication with a common passageway which is in communication with the pressure fluid inlet.

4. A shifting valve as set forth in claim 2 wherein the second multi-passageway array comprises a pair of spaced ports open to the bore and in communication with a common passageway which is in communication with the pressure fluid outlet, and the third multi-passageway array comprises three spaced ports open to the bore and in communication with a common passageway which is in communication with the pressure fluid outlet.

5. A shifting valve as set forth in claim 2 and including check valve means interposed between at least one of the actuator outlets and the pressure fluid outlet for facilitating flow of the pressure fluid during operation of the valve.

6. A shifting valve as set forth in claim 2 wherein there are three actuator outlets, each actuator outlet having two differing pressurized conditions upon said preselected movement of the shifting element whereby six operational modes are provided for the transmission.

7. A shifting valve comprising a valve body means having a bore provided therein, fluid inlet passageway means provided in the body means open to the bore and in communication with a source of pressure fluid, fluid outlet passageway means provided in the valve body means open to the bore and in communication with said source of pressure fluid whereby the pressure fluid may be circulated through the valve, a plurality of actuator outlets provided in the valve body means and in communication with the bore, unitary shifting element means slidably disposed in said bore and movable therein to a plurality of preselected positive positions, a plurality of spaced lands and recesses provided on the outer periphery of the shifting element means for cooperating with the bore to shunt the pressure fluid from the fluid inlet independently to the actuator outlets and collectively from the actuator outlets to the fluid outlet whereby only a single operational mode by an actuator outlet is possible at a time, said shifting element means having at least two selected positions within the bore corresponding to pressurization of each actuator outlet whereby each actuator outlet is pressurized at least during two independent positions of the shifting element to provide two operational functions for each actuator outlet, and wherein there are three actuator outlets, and each actuator outlet provides a different operational output for each pressurization thereof.

* * * * *